(12) United States Patent
Mohamed et al.

(10) Patent No.: US 8,218,844 B2
(45) Date of Patent: Jul. 10, 2012

(54) METHOD FOR GENERATING ANALYTICAL TOOL FOR ANALYZING ABNORMALITIES IN HUMAN ORGANS

(75) Inventors: Ashraf Mohamed, Houston, TX (US); Chenyang Xu, Allentown, NJ (US)

(73) Assignee: Siemens Aktiengesellschaft, München (DE)

( * ) Notice: Subject to any disclaimer, the term of this patent is extended or adjusted under 35 U.S.C. 154(b) by 747 days.

(21) Appl. No.: 12/246,532

(22) Filed: Oct. 7, 2008

(65) Prior Publication Data

US 2009/0214097 A1    Aug. 27, 2009

Related U.S. Application Data

(60) Provisional application No. 61/030,298, filed on Feb. 21, 2008.

(51) Int. Cl.
*G06K 9/54* (2006.01)

(52) U.S. Cl. ......... 382/131; 382/173; 382/209; 128/922

(58) Field of Classification Search .................. 382/131, 382/285
See application file for complete search history.

(56) References Cited

U.S. PATENT DOCUMENTS

| 5,920,319 A * | 7/1999 | Vining et al. ................. 345/420 |
| 6,345,191 B1 * | 2/2002 | Hartmann et al. ............ 600/310 |
| 8,023,726 B2 * | 9/2011 | Sundaresan et al. .......... 382/154 |
| 2005/0142066 A1 * | 6/2005 | Mentzer ......................... 424/9.2 |
| 2006/0013505 A1 * | 1/2006 | Yau et al. ...................... 382/285 |
| 2008/0192997 A1 * | 8/2008 | Grass et al. ................... 382/128 |

OTHER PUBLICATIONS

Vannier et al. "Biomedical Image Segmentation." 1998 IEEE, pp. 20-24.*

* cited by examiner

*Primary Examiner* — Wensing Kuo
(74) *Attorney, Agent, or Firm* — Donald B. Paschburg (57) ABSTRACT

A method for providing a tool for analyzing an abnormality affixed to a human organ. The method includes: obtaining an image of the organ with the abnormality; separating the image of the abnormality from the image of the organ with the abnormality; mapping a surface of the separated image of the abnormality onto a homeomorphic equivalent template, such template being topologically equivalent to the surface. In one embodiment, the mapping is a continuous, bijective, mapping having a continuous inverse mapping characteristic.

13 Claims, 6 Drawing Sheets

METHOD FOR GENERATING ANALYTICAL TOOL FOR ANALYZING ABNORMALITIES IN HUMAN ORGANS

CROSS-REFERENCE TO RELATED APPLICATIONS

This application claims priority from U.S. Provisional application No. 61/030,298 filed Feb. 21, 2008, the entire subject matter thereof being incorporated herein by reference.

TECHNICAL FIELD

This invention relates generally to method for analyzing abnormalities in human organs more particularly to methods for generation of tools for analyzing such abnormalities.

BACKGROUND

As is known in the art, certain abnormalities in organs, such as tumors and aneurysms are manifested as a protrusion from the organ. For example, an intracranial aneurysm is a bulge or dilation in one of the arteries supplying the brain with blood. It bears the medical risk of vessel rupture leading to intracranial bleeding, which in some cases can cause irreparable neurological damage or death of the patient. Aneurysms may be classified according to their shape into saccular and fusiform aneurysm. A saccular aneurysm resembles a small bubble that appears off the side of a blood vessel. A fusiform aneurysm is a bulging around the entire circumference of the vessel. Aneurysm may also be classified according to their site in the circulation into sidewall and bifurcation aneurysms.

As is also known in the art, two approaches exist for the treatment of brain aneurysms. The endovascular approach is performed under guidance from X-ray angiography images. It involves the insertion of wire coils or glue inside the aneurysm with the intention of forming a blood clot inside in order to relieve the pressure against the aneurysm's wall. The second approach for treatment of aneurysms involves neurosurgical clipping of the aneurysm at its neck.

Some aneurysms rupture quickly after their formation, while others may remain without complications for many years.

Findings of the International Study on Unruptured Intracranial Aneurysms (ISUIA) imply an estimated risk of aneurysm rupture between 0.5% and 2.5% per year. The risks and complications associated with either form of treatment combined with the uncertainty of aneurysm rupture imply the need for an approach to differentiate aneurysms that carry a high risk of rupture from those of low risk.

Recent studies suggest numerous factors affecting the risk of aneurysm rupture including demographic and genetic factors, patient history, size and dimensions of the aneurysm, blood flow dynamics, geometry of the parent artery, and the shape of the aneurysm. Investigations that have focused on aneurysm shape and surface attached characteristics across a number of subjects have generally considered global aspects of aneurysms, such as dome height and maximum dimension. Similarly computational fluid dynamics (CFD) studies of aneurysm formation, growth, and risk of rupture compare overall simulation aspects or global (on the whole aneurysm surface) statistics of the simulation results. While some of these investigations were group cross-sectional and longitudinal studies, these studies did not address quantitative comparison of local aneurysm characteristics.

More particularly, studies have revealed some overall shape characteristics that affect the risk of rupture, including aneurysm size, shape, and aspect ratio. Other recent studies have implied a link between the overall distribution of hemodynamic variables such as wall shear stress (WSS) and the risk of rupture. However, since populations of ruptured and unruptured aneurysms overlap under many of the metrics designed to assess the risk of rupture, it is still not possible to estimate the risk of rupture of some aneurysms with reasonable certainty. Large longitudinal and cross-sectional group studies that could reveal possible links between the risk of rupture and the distribution of local variables, such as WSS, are currently not possible due to the absence of an approach for establishing correspondence across aneurysms in different patients and in the same patient at different points in time. The availability of such a technique will enable the use of analysis methods that could unravel important local factors affecting aneurysm rupture.

Currently, there exists no approach to compare local aneurysm surface, or surface attached characteristics (such as those derived from CFD simulations) across a number of different individuals or the same individual at different time points.

Thus, as noted above, it would be advantageous if one could distinguish aneurysms that rupture quickly after their formation from aneurysms that may remain without complications for many years.

SUMMARY

In accordance with the present invention, a method is provided for providing a tool for analyzing an abnormality affixed to a human organ. The method includes: obtaining an image of the organ with the abnormality; separating the image of the abnormality from the image of the organ with the abnormality; mapping a surface of the separated image of the abnormality onto a homeomorphic equivalent template, such template being topologically equivalent to the surface.

In one embodiment, the mapping is a continuous, bijective mapping having a continuous inverse mapping characteristic.

In one embodiment, the abnormality is an aneurysm and the organ is a blood vessel.

In one embodiment, a reference in the template is direction of blood flow through the artery.

In one embodiment, one point of the reference is the intersection between a surface of the aneurysm and the blood vessel.

In one embodiment, the mapping is of surface topology.

In one embodiment, the mapping is of surface pressure distribution.

In one embodiment, the mapping is of surface wall shear stress.

With method, a standardized mapping of the surface of an aneurysm into a standardized parametric template space is provided. This mapping makes it possible to conduct longitudinal and cross-sectional group studies which test hypothesis linking local surface-attached variables (such as local surface irregularities, i.e., with aneurysm growth and the risk of rupture. The template acts as a normalized space where local variables associated with different aneurysm surface points can also be mapped, and statistical cross-sectional or longitudinal studies can be performed. Thus, the method generates a tool for analyzing intracranial aneurysms.

In addition, since the generated standardized mapping is continuous and invertible, its inverse exists, and this inverse provides a means for parameterization of the surface of the aneurysm. In other words, since each point on the unit disc is associated with a pair of coordinates or parameters (e.g., radius and angle from a reference axis), therefore, the inverse mapping (from the unit disc to the surface of the aneurysm) associates a pair of parameters with each point on the surface of the aneurysm. Having created this parameterization of the aneurysm surface, it is possible to apply various image and signal processing and analysis methods (e.g., wavelet or Fourier analysis) for studying physical properties associated with the aneurysm surface. The application of such methods for analyzing aneurysm surfaces is not possible without such a parameterization provided by the invention.

Moreover, due to the surface flattening achieved by this mapping this approach provides a novel technique for visualization of the aneurysm surface on the standardized parametric space. This provides a standardized way of visual examination of aneurysm surfaces by clinicians and researchers to thereby enable him/her to distinguish aneurysms that rupture quickly after their formation from aneurysms that may remain without complications for many years. The availability of such a technique will enable the use of analysis methods that could unravel important local factors affecting aneurysm rupture.

More particularly, the method maps the surface of saccular intracranial aneurysms to a parametric space, thereby providing aneurysm visualization capabilities and allowing three-dimensional aneurysm surface shape analysis and group studies. The method enables improved visualization of the aneurysm surface attached quantities or simulation variables, assessment of the risk of aneurysm rupture based on shape and based on computational fluid dynamics simulations, and assistance in planning of endovascular interventions.

Thus, with the invention, the mapping allows the diagnostician to collect statistical information based on data from different aneurysms. Thus, while there may not be information on the unit disc that is critical on its own, all data comes from the surface of the segmented aneurysms and thus the method allows the diagnostician to collect statistics from different aneurysms, to parameterize, and to visualize the surface of aneurysms. That is, aneurysms which are at risk of rupture may have patterns on the map different from patterns on the map generated from aneurysms less likely to rupture burst. The same may apply to tumors that are of more concern, e.g., aggressive tumors, than for tumors of less concern.

The details of one or more embodiments of the invention are set forth in the accompanying drawings and the description below. Other features, objects, and advantages of the invention will be apparent from the description and drawings, and from the claims.

DESCRIPTION OF DRAWINGS

FIGS. 4A-4D shows mapping, according to the invention, of an unruptured sidewall ICA aneurysm to the unit disc.

FIGS. 5A-5D show mapping according to the invention of 4 aneurysms shown across the whole of FIGS. 5A-5D, i.e., in each of FIGS. 5A, 5B, 5C, and 5D, there are 4 aneurysms. The two aneurysms on the left are unruptured and the two on the right are ruptured.

Like reference symbols in the various drawings indicate like elements.

DETAILED DESCRIPTION

Figure 1:
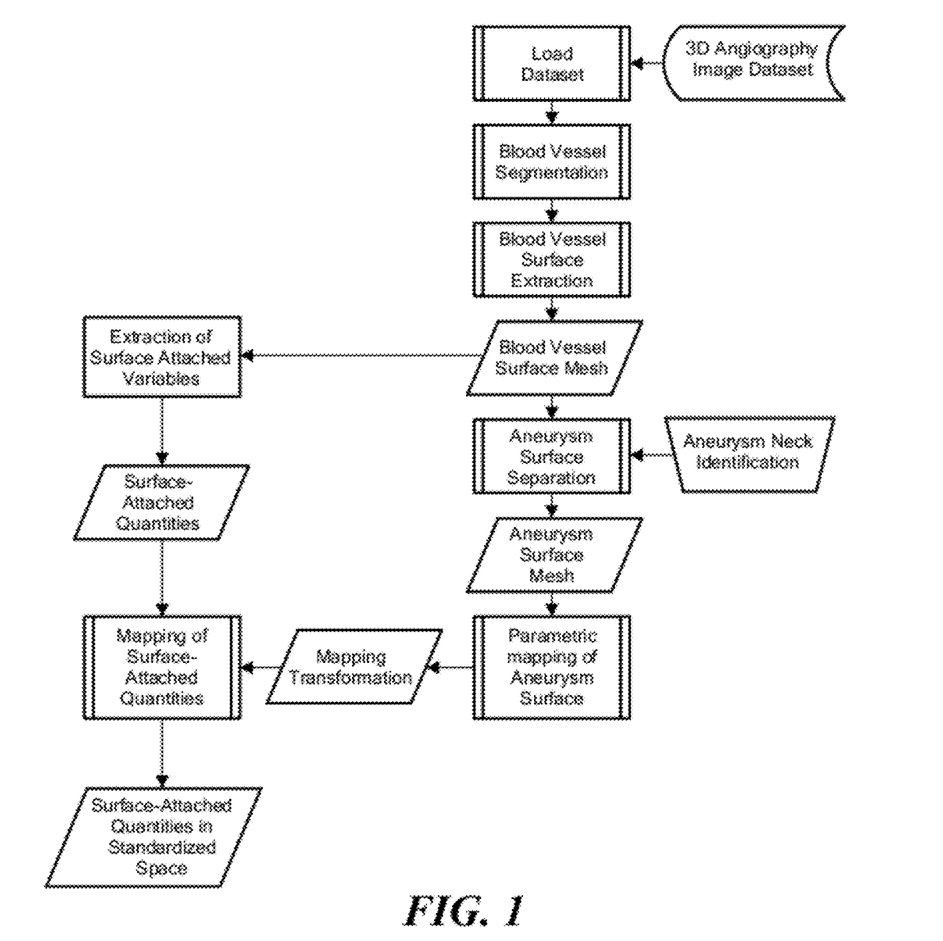
FIG. 1 is a flow chart illustrating the various steps involved in an embodiment of the current invention in generating a tool for analyzing an abnormality affixed to a human organ according to the invention.

Referring now to FIG. 1, a flowchart of the process used to tool for analyzing an abnormality, here an intracranial aneurysm, from a human organ, here from a blood vessel, is shown. It is first noted that the method can be applied to three dimensional (3D) images of any medical imaging modality in which blood vessels and aneurysms are visible. This includes 3D Digital Subtraction Angiography (DSA), Magnetic Resonance Angiography (MRA), or Computed Tomography Angiography (CTA).

Thus, after obtaining an image of the organ with the abnormality and loading the obtained data into a suitable data processor, a conventional segmentation method is used to separate blood vessels from background image voxels. This segmentation method depends on the imaging modality used. Numerous vessel segmentation approaches have been described in the literature. Segmentation is the only step that is imaging modality dependent in the current invention.

Next, a surface mesh of the segmented blood vessel with the aneurysm is extracted using a surface mesh of the blood vessels (including any aneurysms) from the segmented 3D image using any conventional process. For example, an approach that generates a triangular surface mesh from volumetric datasets can be used, such as the marching cubes algorithm or any of its variants. See for example, C. Lin and M. J. Perry. Shape description using surface triangulation. In Proceedings, IEEE Workshop on Computer Vision: Representation and Control, pages 38-43, 1982. The used approach needs to preserve the topological properties of the aneurysm surface (e.g., generates no handles or surface holes).

Next, the method separates the image of the abnormality (here separates the image of the aneurysm) from the image of the organ (here blood vessel) and the abnormality and parametrically maps a surface of the separated abnormality onto a homeomorphic equivalent template, such template being topologically equivalent to the surface.

More particularly, the parametric mapping is applied to the surface of the aneurysm only, and not the surface of the blood vessels to which it is attached. Therefore, before this mapping is applied, it is necessary to separate the aneurysm from the blood vessels to which it is attached. This can be achieved in a number of ways. For example, Methods that segment an aneurysm from its parent vessels by reconstructing an approximation of the healthy vessel before aneurysm formation can be used [see for example, C. Karmonik, C. M. Strother, X. Chen, F. Deinzer, R. Kluznik, M. E. Mawad, "Stent-Assisted Coiling of Intracranial Aneurysms Aided by Virtual Parent Artery Reconstruction," American Journal of Neuroradiology, 26:2368-2370, October 2005; C. Karmonik, M. E. Mawad, "Creating Surface Model of Intracranial Aneurysm in Artery to Visualize Complexities and aid Pre-treatment Planning, by Determining Center, Artery Radius, Boundary Points, Aneurysm Angle, Neck Length and Dome Height, and Neck Area," US Patent no. US2006184066-A1. Aug. 17, 2006. In this invention, we use a semi-automated approach with two variations:

A. The physician (user) selects 3 or more evenly separated points manually at the aneurysm neck (ostium) on the vessel surface mesh. A computation of the geodesic shortest path connecting these points in a closed loop on the surface of the mesh generates a partition of the surface mesh into an aneurysm part and a normal vessel part.

B. The physician clicks a single point on the aneurysm dome. A contour expands from this point until it latches on the aneurysm neck. The aneurysm neck is decided based on both the geodesic length of the contour and the surface curvature properties.

Approach A is generally suitable for most kinds of aneurysms. Approach B is more suitable for a saccular aneurysm.

The goal of the mapping is to generate a mathematical transformation:

$$\phi: S \to T,$$

where S is the surface of an aneurysm to be mapped to the template T. We require the following important property of this transformation:

The domain S and template T must be topologically equivalent to each other (mathematically speaking, they are homeomorphic). This implies that there exists a function mapping S to T that is continuous, bijective (one-to-one and onto), and with a continuous inverse.

The mapping $\phi$ is an example of a homeomorphic function. Since saccular aneurysms are hypothesized to develop from a diseased focal spot on the walls of an artery, a topologically equivalent template for these types of aneurysms could be any one of the following:

The unit disc

A sphere with one cap cut off (e.g., a hemisphere)

The plane

All of these two-dimensional surfaces are essentially topologically equivalent to each other and to the surface of a saccular aneurysm. We cannot use the whole sphere because that would be not topologically equivalent to the aneurysm surface; however, a sphere can be used if the abnormality is a tumor.

Figure 2A:
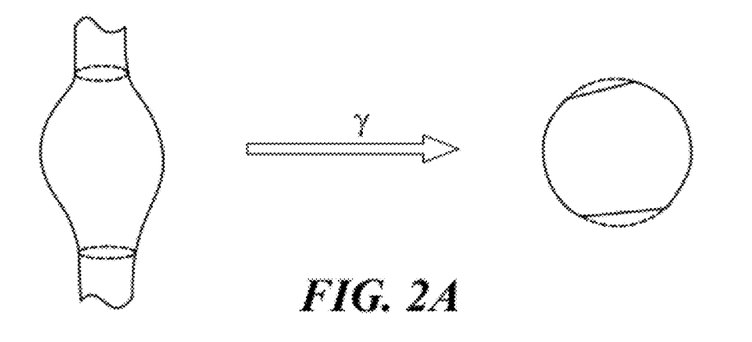
FIG. 2A shows mapping of a fusiform aneurysm to a sphere with two caps cut-off.
Figure 2B:
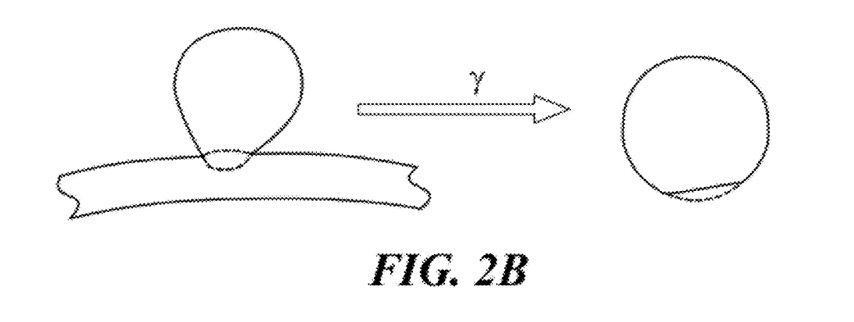
FIG. 2B shows mapping of a saccular aneurysm to a sphere with one cap cut-off.
Figure 2C:
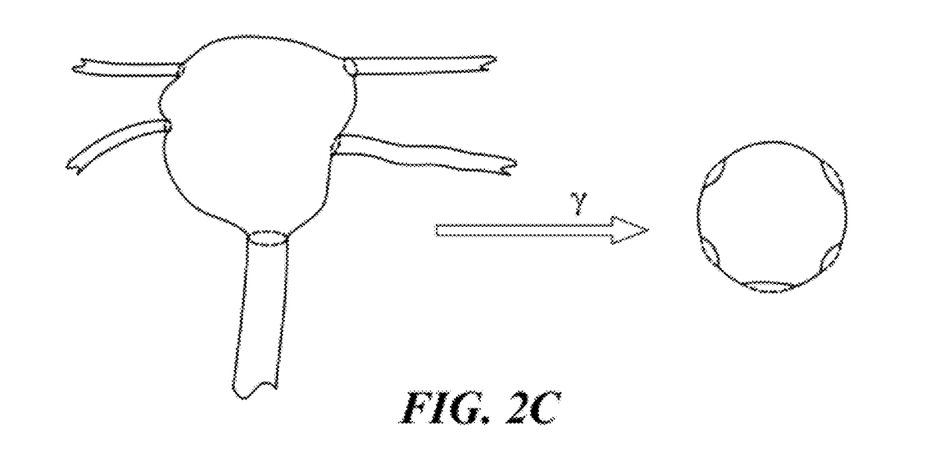
FIG. 2C shows mapping of a fusiform basilar segment aneurysm to a sphere with 5 caps cut-off.

For a fusiform aneurysm that involves the whole circumference of a single artery, a topologically equivalent surface is that of a cylinder open at both ends. For a fusiform aneurysm that involves multiple arteries (e.g., the Middle Cerebral Artery or the branching tip of the Basilar Artery), a topologically equivalent surface is that of a sphere with several non intersecting caps removed. The number of caps removed from the sphere is equal to the total number of in-flowing and out-flowing arteries attached to the aneurysm. Examples are shown in FIGS. 2A-2C. FIG. 2A shows mapping of a fusiform aneurysm to a sphere with two caps cut-off; FIG. 2B shows mapping of a saccular aneurysm to a sphere with one cap cut-off; and FIG. 2C shows mapping of a fusiform basilar segment aneurysm to a sphere with 5 caps cut-off.

In the sequel, mappings of saccular aneurysms to a disc and are demonstrated. However, the shown results are equally valid for other types of aneurysms and other templates. The results are also equally valid for other abnormalities, such as tumors, and topologically equivalent templates.

Consider for example, the mapping of a saccular aneurysm to the unit disc. Since coordinates can be assigned to every point in the unit disc ((r, θ): a radius and an angle), and since the mapping $\phi$ is bijective and invertible, a unique pair of coordinates (or parameters) is assigned to each point on the aneurysm surface by the inverse mapping $\phi^{-1}$. Therefore, the inverse mapping $\phi^{-1}$ provides a parameterization of the surface of the aneurysm. Mapping different aneurysm surfaces onto the same template space establishes correspondence between points assigned the same parameters on the different aneurysms. Moreover, the template space acts as a normalization domain, to which data attached to different aneurysm surfaces can be pooled (via the transformation $\phi$) and used for cross-sectional and longitudinal group studies.

There are many ways to obtain a homeomorphic mapping $\phi$. To minimize distortion caused by the mapping, it is possible to choose the mapping to preserve a local quality of the surface S. For example, it is possible to choose $\phi$ to preserve local area (area-preserving mapping) or to preserve local angles (conformal mapping). The preferred embodiment in this invention will be to select $\phi$ to be a conformal mapping. Such a mapping may be found by the mathematical approach described by S. Haker, S. Angenent, A. Tannenbaum, R. Kikinis, G. Sapiro, M. Halle "Conformal Surface Parameteriztion for Texure Mapping," IEEE Transactions on Visualization and Computer Graphics, 6(2), pp. 181-189, April-June 2000 X. Gu, Y. Wang, T. F. Chan, P. M. Thompson, S.-T. Yau, "Genus Zero Surface Conformal Mapping and Its Applications to Brain Surface Mapping," IEEE Transactions on Medical Image Analysis, 23(8), pp. 949-958 August 2004.

Figure 3:
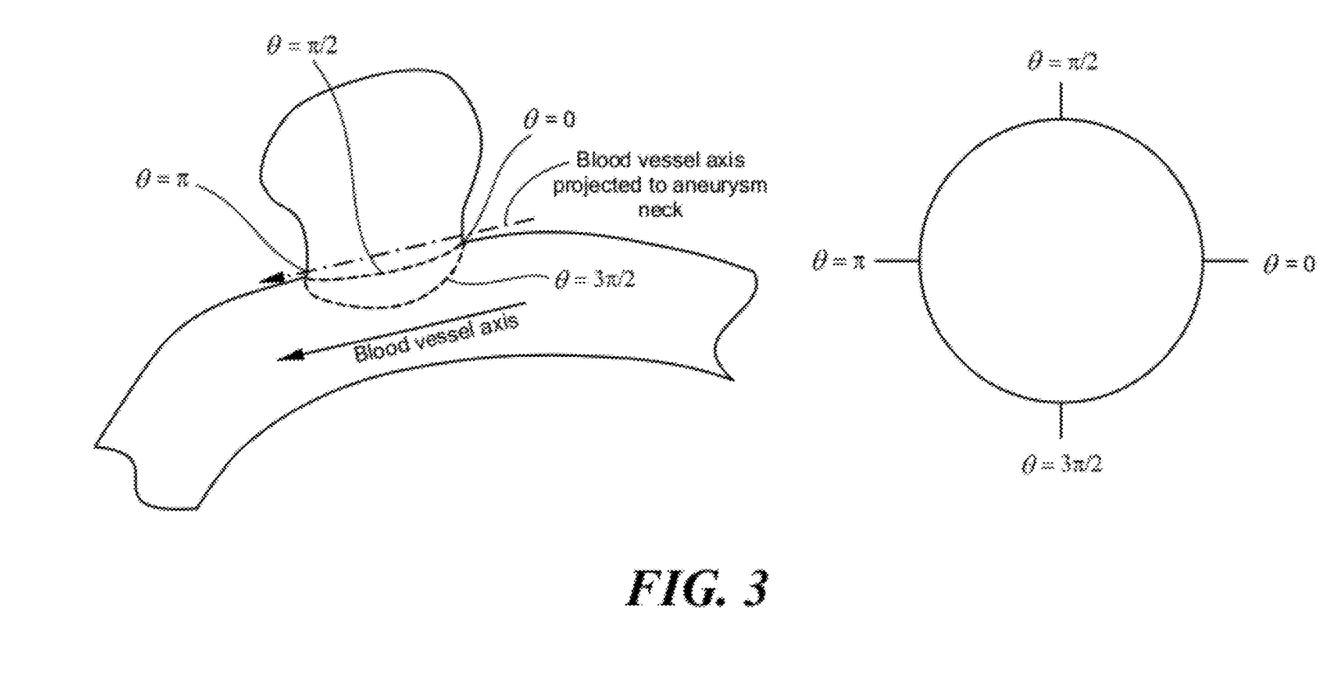
FIG. 3 shows mapping, according to the invention, of sidewall Internal Carotid Artery (ICA) aneurysms to the unit disc. The aneurysm neck is a closed topological circle and the most proximal neck point may be found from the parent vessel's orientation. Mesh partitioning separates the aneurysm from its parent vessel at the neck. The function φ maps the aneurysm surface onto the unit disc such that the most proximal point goes to θ=0.

The boundary of a saccular aneurysm surface after its separation from the parent artery or arteries is the neck of the aneurysm, which is topologically equivalent to a circle. Therefore, $\phi$ should map the aneurysm neck B to the outer edge of the unit disc. If comparison across different aneurysms on the same normalized space is necessary, the mapping must preserve the aneurysm's orientation with respect to the parent artery. In this case, two special points are defined on the neck of the aneurysm and are obtained by projection of the parent blood vessel axis to the neck of the aneurysm. The proximal point and the distal point will correspond to the outer edge of the unit disc at locations with θ=0 and θ=π respectively. Other points on the aneurysm surface are assigned boundary conditions based on their distance along the neck from these two points. We note, that a similar approach, which is described in details below, may be devised by using a single point on the neck of the aneurysm (e.g., the most proximal point mapped to θ=0 and all other points around the neck are assigned boundary conditions based on their distance from this point in the counter clockwise direction). Depiction of the boundary conditions is shown in FIG. 3. Here, FIG. 3 shows the boundary conditions of the mapping $\phi$ for a saccular aneurysm to the unit disc on the left and a saccular aneurysm with. Points with θ=0 and θ=π are found by projection of the blood vessel axis onto the aneurysm's neck. Other points around the neck of the aneurysm are found based on their distance from these two points. The right side of FIG. 3 shows the unit disc with four points on its boundary corresponding to the points on the aneurysm's neck shown in the left side of FIG. 3.

The standardized mapping of the surface of an aneurysm into a standardized parametric space, such as the unit disc, has a large number of pre-clinical and clinical research applications. From these, here we mention a few:

Mapping many aneurysms into the same standardized space makes it possible to conduct longitudinal and cross-sectional group studies which test hypothesis linking local surface-attached variables (such as local surface irregularities, c.f. [see J. Beck, S. Rohde, M. El Beltagy, M. Zimmermann, J. Berkefel, V. Seifert, A. Raabe, "Difference in configuration of ruptured and unruptured intracranial aneurysm determined by biplanar digital subtraction angiography," Acta Neurochir, 145:861-865, 2003] with aneurysm growth and the risk of rupture.

Data from various aneurysms mapped to a standardized space, such as the unit disc, can be used to create statistical atlases of localized physiological and geometrical information (e.g., wall pressure and curvature) on this standardized space. Mapping of information from statistical atlases to new aneurysm cases makes this information available for analysis and decision making. Clinical applications include the assessment of aneurysm risk of rupture and the study of aneurysm formation and growth mechanisms.

In addition, the inverse of the generated mapping provides a parameterization of the aneurysm surface, which therefore allows the use of various image and signal processing methods to analyze the surface of an aneurysm and any physical quantities associated with this surface. This has also a large number of clinical and preclinical applications in study of aneurysm growth and risk of rupture.

Due to the surface flattening achieved by this mapping, this approach provides a novel technique for visualization of the aneurysm surface on the standardized parameteric space. This may provide a standardized way of visual examination of aneurysm surfaces by clinicians and researchers.

As described above, one template may be a unit disc. Thus, consider the unit disc in more detail, reference is again made to FIG. 3, assume that a representation of the aneurysm surface and the blood vessels to which it is attached is available. This surface representation may, for example, be obtained through segmentation of the vasculature from a 3D angiographic medical image (e.g., X-ray or magnetic resonance angiography) followed by isosurface extraction to produce a triangular surface mesh. Assume that the surface of the aneurysm has been separated from the parent artery after identification of the neck and performing mesh partitioning via a proper method. Sidewall aneurysms originate from a diseased focal spot of the artery wall and their surface may therefore be assumed topologically equivalent to the unit disc. Therefore, the unit disc may be chosen as a canonical space for this class of aneurysms.

Let $S \in R^3$ denote the surface of the aneurysm and assume that S is a smooth genus 0 (with no holes or handles) orientable surface. Since S is topologically equivalent to the unit disc $D=\{(u, v): u^2+v^2 \leq 1\}$, its boundary B with total length L is a topological circle. The goal of the surface mapping problem is to find a smooth and bijective (therefore invertible) function $\phi: S \to D$ such that B is mapped to the unit circle. To specify the problem further, assume that point $A \in B$ must be mapped to the point (1,0) (i.e., $\theta=0$) and define $l_p$ as the distance along B from A to any point $p \in B$ traveling in the counterclockwise direction while observing the outside surface of S. Here the reference direction is the direction of blood flow through the artery. We choose point A to be the most proximal point on the aneurysm neck; here the point at which the blood enters the aneurysm (the proximal point). Defining $\Delta$ as the Laplace-Beltrami operator on S, a harmonic mapping $\phi=(u, v)$ is found by solving the Dirichlet problem [see Hacker, S., Angenent, S., Tannenbaum, A., Kikinis, R.: Nondistorting flattening maps and the 3-D visualization of colon ct images. IEEE Transactions on Medical Imaging 19 (7) (July 2000) 665-670 and Hacker, S., Angenent, S., Tannenbaum, A., Kikinis, R., Sapiro, G., Halle, M.: Conformal surface parameterization for texture mapping. IEEE Transactions on Visualization and Computer Graphics 6(2) (April-June 2000) 181-189:

$$\left.\begin{aligned}\Delta u(p) &= 0 \\ \Delta v(p) &= 0\end{aligned}\right\} p \in S \backslash B \quad (2)$$

$$\left.\begin{aligned}u(p) &= \cos(2\pi l_p / L) \\ v(p) &= \sin(2\pi l_p / L)\end{aligned}\right\} p \in B \quad (3), (4)$$

The harmonic mapping $\phi$ is the minimizer of the Dirichlet functional [see Floater, M. S., Hormann, K.: Surface Parameterization: a Tutorial and Survey. In: Advances in Multiresolution for Geometric Modelling. Springer-Verlag, Heidelberg (2005) 157-186:

$$D(\varphi) \equiv \frac{1}{2} \int_S (\|\nabla u\|^2 + \|\nabla v\|^2) dS \quad (5)$$

subject to the boundary conditions (3), (4). Equation (5) implies that $\phi$ minimizes the deformation induced by the mapping.

To obtain a discrete harmonic map $\phi_T$ over the triangular surface mesh $S_T$ which is a discretization of S, we use linear finite element theory, see Floater, M. S., Hormann, K.: Surface Parameterization: a Tutorial and Survey. In: Advances in Multiresolution for Geometric Modelling. Springer-Verlag, Heidelberg (2005) 157-186 and Hacker. S., Angenent, S., Tannenbaum, A., Kikinis, R.: Nondistorting flattening maps and the 3-D visualization of colon ct images. IEEE Transactions on Medical Imaging 19 (7) (July 2000) 665-670]. Let $B_T$ be the boundary of $S_T$. The minimization of the functional (5) over the set of all piecewise linear functions on $S_T$ is achieved by the transformed mesh node coordinates $(U_Y, V_Y), Y \in S_T \backslash B_T$ satisfying the linear equations:

$$\sum_{Y \in S_T \backslash B_T} D_{XY} U_Y = -\sum_{Y \in B_T} D_{XY} \cos(2\pi l_Y / L) \quad (6)$$

$$\sum_{Y \in S_T \backslash B_T} D_{XY} V_Y = -\sum_{Y \in B_T} D_{XY} \sin(2\pi l_Y / L) \quad (7)$$

which can be written in matrix form as:

$$Du = b_u \text{ and } Dv = b_v \quad (8)$$

The elements $D_{XY}$ are easily computed from the geometry of $S_T$ as follows [see Hacker, S., Angenent, S., Tannenbaum, A., Kikinis, R.: Nondistorting flattening maps and the 3-D visualization of colon ct images. IEEE Transactions on Medical Imaging 19(7) (July 2000) 665-670]. For each edge XY belonging to two triangles XYJ and XYK, we have $$D_{XY} = -0.5(\cot(\angle J) + \cot(\angle K)) \quad (9)$$

where $\angle J$ is the angle at the vertex J in the triangle XYJ and $\angle K$ is the angle at vertex K in the triangle XYK. If mesh nodes X and Y are not connected by an edge then $D_{XY}=0$. The diagonal entries of D are computed as:

$$D_{XX} = -\sum_{Y \neq X} D_{XY} \qquad (10)$$

Since the matrix D is positive definite, symmetric and sparse [see Floater, M. S., Hormann, K.: Surface Parameterization: a Tutorial and Survey. In: Advances in Multiresolution for Geometric Modelling. Springer-Verlag, Heidelberg (2005) 157-186 and Hacker, S., Angenent, S., Tannenbaum, A., Kikinis, R.: Nondistorting flattening maps and the 3-D visualization of colon ct images. IEEE Transactions on Medical Imaging 19 (7) (July 2000) 665-670], we use the conjugate gradient method to compute the solutions u and v. Since $\phi_T$ is harmonic and maps the boundary $B_T$ homeomorphically into a convex region $D \in R^2$, therefore, $\phi$ is bijective. We note that a harmonic map need not be conformal (preserve local angles) in general. However, the results provided below, indicate that the deviation of this harmonic map from conformality is small.

We illustrate the utility of the mapping approach described above in the surface flattening and visualization of CFD simulation results for sidewall ICA aneurysms. The triangular surface meshes used for CFD simulations and for flattening are based on 3D digital subtraction angiography (DSA) images (syngo Inspace 3D, Siemens Healthcare, Forchheim, Germany) with a typical size of 512×512×400 and isotropic voxel size of 0.4 mm. A subvolume region of interest for CFD simulations is defined manually to include the aneurysm and the parent vessel. The used image segmentation approach involves smoothing, thresholding, connected component labeling, and hole filling in order to generate a segmented object with a genus 0 surface. Steady-state (diastole) CFD simulations are carried out and the resulting surface attached WSS is extracted. Details of the surface mesh generation approach and CFD simulations methods can be found in Jou, L. D., Wong, G., Dispensa, B., Lawton, M. T., Higashida, R., Young, W. L., Saloner, D.: Correlation between lumenal geometry and hemodynamics in fusiform intracranial aneurysms. American Journal of Neuroradiology 26 (October 2005) 2357-2363 and Jou, L. D., Lee, D. H., Morsi, H., Mawad, M. E.: Wall shear stress on ruptured and unruptured intracranial aneurysms at the internal carotid artery. American Journal of Neuroradiology (October 2008).

We evaluate the angle and area distortion introduced by the devised mapping via the following measures. Let $A_a$ be the total original aneurysm mesh surface area and XYZ be a triangle in this mesh with area $A_{XYZ}$ before mapping and area $\tilde{A}_{XYZ}$ after mapping. With the area of the unit disc equal to $\pi$, the area distortion of XYZ may be defined as $$d_{XYZ} \equiv \frac{\tilde{A}_{XYZ}}{A_{XYZ}} \cdot \frac{A_a}{\pi} \qquad (11)$$

At each mesh vertex X connected to M triangles in the original mesh, let $a_{Xi}$, i=1, ..., M denote the ratio of the angle i to the sum of all angles around X. Let the similar ratio for the mapped mesh be denoted by $\tilde{a}_{Xi}$, i=1, ..., M. The angle distortion error $|\tilde{a}_{Xi} - a_{Xi}|/a_{Xi}$ is averaged over all triangles attached to X to produce a single value at X, and then the overall average for the whole mesh is computed. Angle distortion errors computed over 15 aneurysms were 6.1% on average with a maximum of 10.6% and minimum of 2.8%. These results indicate that the devised mapping is at least close to being quasi-conformal. The FE implementation of the mapping typically takes one second or less on a modern day computer (2.13 GHz Intel Pentium M, 2.0 GB of RAM). The number of nodes of the aneurysm surface meshes was 11192 on average.

Figure 4A:
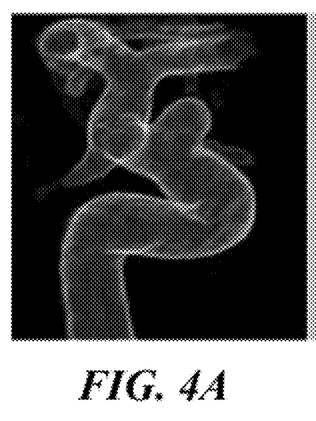
FIG. 4A showing volume rendered 3D DSA image of the artery and aneurysm.
Figure 4B:
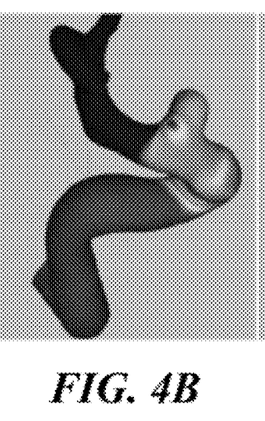
FIG. 4B showing surface rendered image after CFD simulation showing wall pressure values.
Figure 4C:
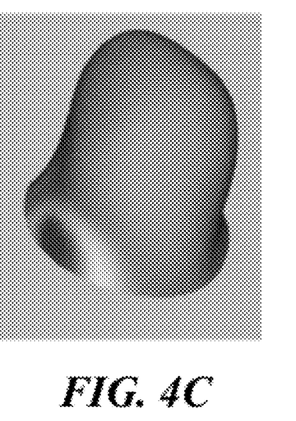
FIG. 4C shows aneurysm surface with attached wall pressure after neck identification and mesh partitioning.
Figure 4D:
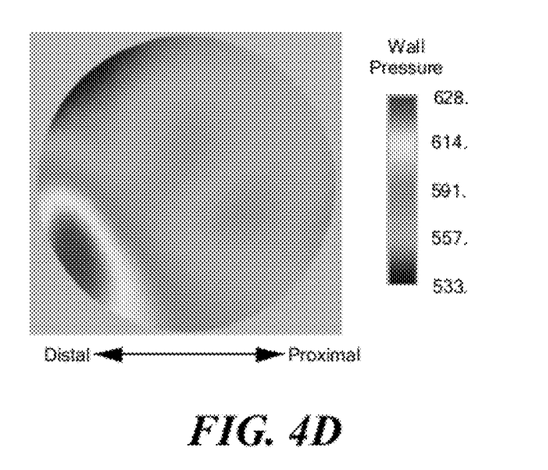
FIG. 4D shows wall pressure values mapped to the unit disc.

In FIGS. 4A-4D, we demonstrate the approach via an example unruptured ICA aneurysm. More particularly, FIGS. 4A 4D show mapping, according to the invention, of an unruptured sidewall ICA aneurysm to the unit disc; FIG. 4A showing volume rendered 3D DSA image of the artery and aneurysm; FIG. 4B showing surface rendered image after CFD simulation showing wall pressure values; FIG. 4C shows aneurysm surface with attached wall pressure after neck identification and mesh partitioning; and FIG. 4D shows wall pressure values mapped to the unit disc.

The mapping allows the visualization of the whole aneurysm surface at once, thereby easily understanding the spatial variation of quantities, such as wall pressure. For dynamic CFD studies, our results indicate that it is substantially more easy to visually observe pattern changes over the whole surface across time in a cine-type image over the unit disc. It is noted that the examples are shown using a grayscale to show how the variables are mapped from the aneurysm to the unit disc and their distribution, however such variables would typically be presented in color where different colors represent different values of the wall pressure/wall shear stress.

In FIG. 5 we compare WSS patterns from two unruptured and two ruptured aneurysms. More particularly, FIGS. 5A-5C show mapping according to the invention of 4 aneurysms shown across the whole of FIGS. 5A-5D, i.e., in each of FIGS. 5A, 5B, 5C, and 5D, there are 4 aneurysms. The two aneurysms on the left are unruptured and the two on the right are ruptured. In FIG. 5A, the surface of all 4 aneurysms are shown with values of WSS. In FIG. 5B, the WSS of the 4 aneurysms are shown after mapping to the unit disc. In FIG. 5C the area distortion is shown for all 4 aneurysms. In FIG. 5D, the parameterization of the aneurysm surfaces are shown via radial lines and circles of increasing diameters on the unit disc.

It is noted that the examples are shown using a grayscale to show how the variables are mapped from the aneurysm to the unit disc and their distribution, however such variables would typically be presented in color where different colors represent different values of the wall pressure/wall shear stress.

Figure 5A:
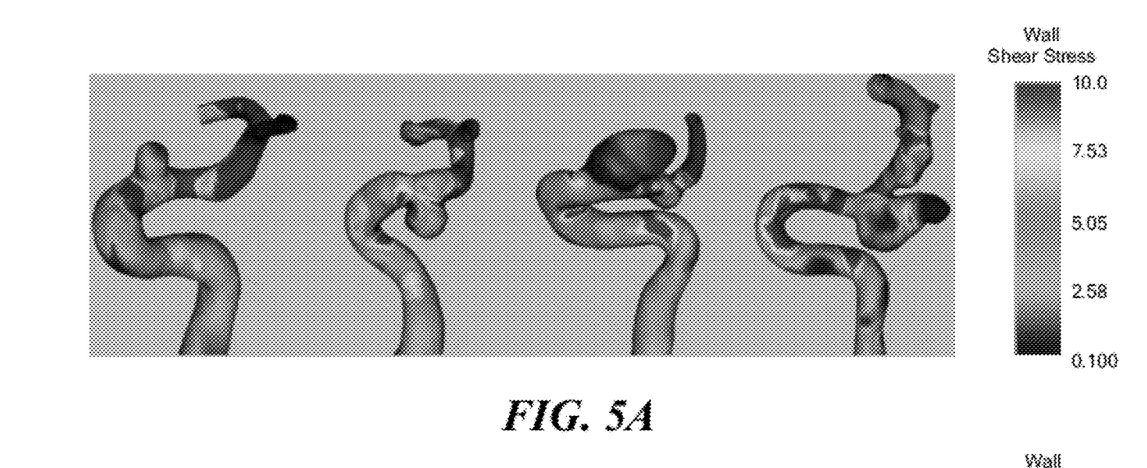
In FIG. 5A, the surface of all 4 aneurysms are shown with values of WSS.
Figure 5B:
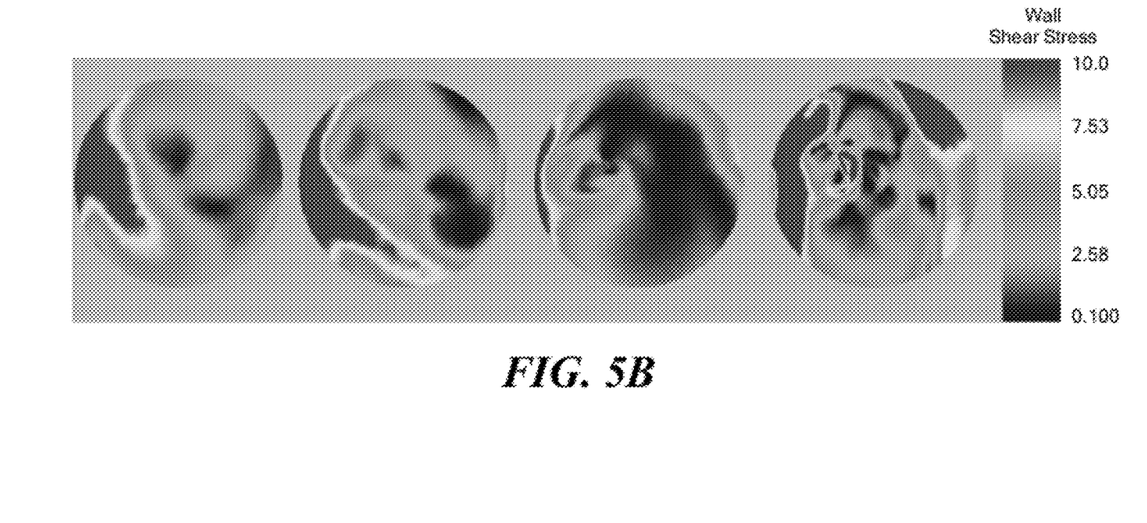
In FIG. 5B, the WSS of the 4 aneurysms are shown after mapping to the unit disc.
Figure 5C:
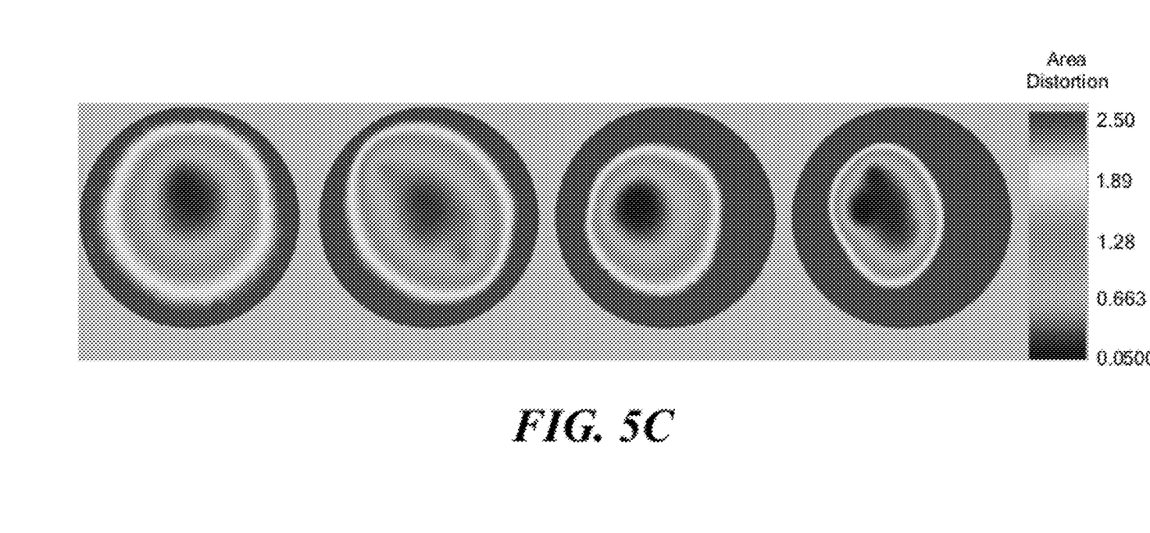
In FIG. 5C the area distortion is shown for all 4 aneurysms.
Figure 5D:
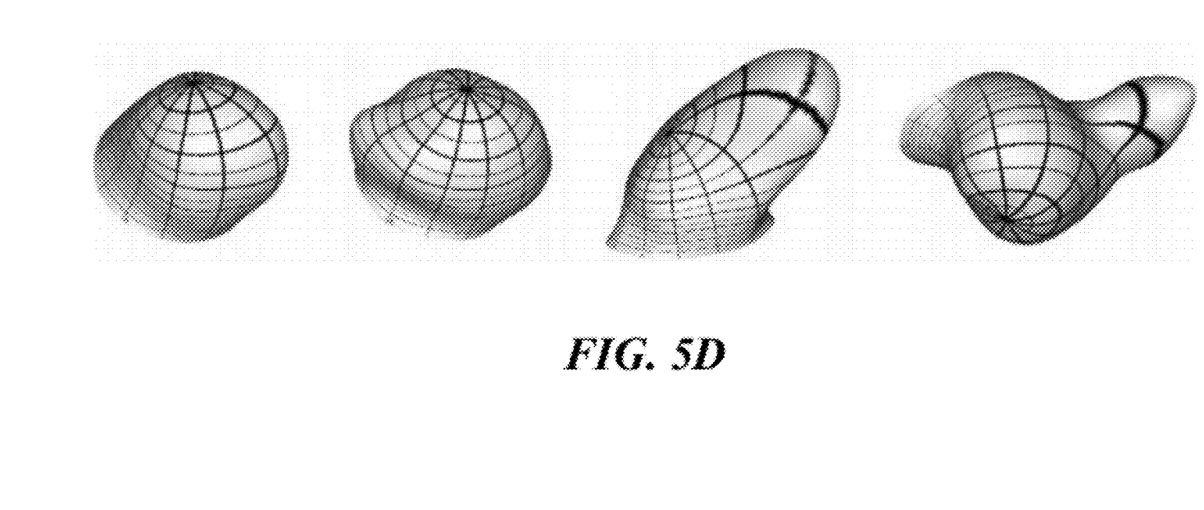
In FIG. 5D the parameterization of the aneurysm surfaces are shown via radial lines and circles of increasing diameters on the unit disc.

The patterns in FIG. 5B agree with the conclusions drawn in Jou, L. D., Lee, D. H., Morsi, H., Mawad, M. E.: Wall shear stress on ruptured and unruptured intracranial aneurysms at the internal carotid artery. American Journal of Neuroradiology (October 2008. Despite the absence of differences in the range of WSS between ruptured and unruptured aneurysms, the distribution of the WSS seems to vary more rapidly over the unit disc for ruptured aneurysms. These rapid changes seem to be related to shape irregularities of ruptured aneurysms. From the flattened WSS maps in FIG. 5B, it is further easy to conclude that the low WSS region occurs at the proximal aneurysm wall, locates at the dome, or occupies most of the entire aneurysm; the high wall shear stress region often, but not always, occurs at the distal part of the surface. In FIG. 5C, we show the area distortion due to the mapping. The results based on these limited samples, as well as others not shown here, indicate that the distribution of the blue areas ($d_{XYZ}$ close to 0, or relative compression due to mapping) is more eccentric and distal for ruptured ICA aneurysms than for unruptured ones. The same observation of significant distortion off the center of the disc is also evident through the parameterization of the aneurysm surface according to the computed mapping, as illustrated in FIG. 5D.

Thus, with the invention:

1. The mapping allows collection of information from different aneurysms (or same aneurysm at different points in time) into a common standardized template space, where statistical analysis may be carried out on any (physical) quantity associated with the surface of the aneurysm.

2. The mapping provides a shape descriptor of the aneurysm that may be used to analyze local and global shape aspects, compare and categorize aneurysms in different groups.

3. The mapping is invertible, and therefore, its inverse exists and provides a parameterization of the surface of the aneurysm. This allows the use of many other techniques for analysis of physical quantities associated with the surface of the aneurysm (e.g., using Fourier or wavelet analysis).

4. The mapping unfolds the surface of the aneurysm onto the unit disc, thereby providing novel visualization capabilities that can assist the diagnostician to easily see and detect patterns of change in any variables of physical quantity defined over the surface of the aneurysm.

A number of embodiments of the invention have been described. Nevertheless, it will be understood that various modifications may be made without departing from the spirit and scope of the invention. Accordingly, other embodiments are within the scope of the following claims.

What is claimed is:

1. A method for providing a tool for analyzing a saccular aneurysm affixed to a blood vessel, comprising:
    obtaining an image of the saccular aneurysm affixed to the blood vessel with a medical imaging device;
    separating an image of the saccular aneurysm from the image of the saccular aneurysm affixed to the blood vessel, wherein the saccular aneurysm is separated from the blood vessel at a neck of the saccular aneurysm;
    mapping a surface of the separated image of the saccular aneurysm onto a homeomorphic equivalent template, such template being a unit disc and topologically equivalent to the surface, wherein a boundary of the unit disc corresponds to points of the neck of the saccular aneurysm.

2. The method recited in claim 1 wherein the mapping is a continuous, bijective, mapping having a continuous inverse mapping characteristic.

3. The method recited in claim 1 wherein a reference in the template is direction of blood flow through an artery.

4. The method recited in claim 1 wherein the mapping is of surface topology.

5. The method recited in claim 1 wherein the mapping is of surface pressure distribution.

6. The method recited in claim 1 wherein the mapping is of surface wall shear stress.

7. The method recited in claim 1 wherein the mapping is of local surface curvature.

8. The method recited in claim 1 wherein the mapping is local aneurysm wall thickness.

9. The method recited in claim 1 wherein the mapping provides a shape descriptor of the aneurysm.

10. The method recited in claim 1, wherein in the image of the saccular aneurysm affixed to the blood vessel a surface mesh of the blood vessel is generated.

11. The method recited in claim 10, wherein three or more separation points are manually placed at the neck of the aneurysm on the surface mesh of the blood vessel.

12. The method recited in claim 1, wherein the neck is determined by expanding a contour from a point on a dome of the aneurysm to the surface of the blood vessel.

13. The method recited in claim 1, further comprising:
    repeating the steps of claim 1 for another image of a saccular aneurysm affixed to a blood vessel.

* * * * *